United States Patent [19]

Henseler et al.

[11] Patent Number: 5,427,409
[45] Date of Patent: Jun. 27, 1995

[54] FOLDED AIRBAG COVER PANEL

[75] Inventors: Wolfgang Henseler, Tuebingen; Stephan Schreiner, Moetzingen, both of Germany

[73] Assignee: Mercedes-Benz AG, Germany

[21] Appl. No.: 223,612

[22] Filed: Apr. 6, 1994

[30] Foreign Application Priority Data

Apr. 6, 1993 [DE] Germany .......................... 43 11 241.2

[51] Int. Cl.⁶ .............................................. B60R 21/22
[52] U.S. Cl. .................................. 280/728.3; 280/732
[58] Field of Search ............ 280/728 B, 728 A, 728 R, 280/732, 731

[56] References Cited

U.S. PATENT DOCUMENTS

| 5,013,064 | 5/1991 | Miller et al. | 280/728 B |
| 5,062,663 | 11/1991 | Satoh | 280/728 B |
| 5,211,421 | 5/1993 | Catron et al. | 280/728 A |
| 5,332,257 | 7/1994 | Rogers et al. | 280/728 B |

FOREIGN PATENT DOCUMENTS

| 0370613 | 5/1990 | European Pat. Off. | |
| 3800652 | 7/1988 | Germany . | |
| 4137926 | 5/1992 | Germany . | |
| 3258634 | 11/1991 | Japan | 280/728 B |
| 4027634 | 1/1992 | Japan | 280/728 B |
| 2265119 | 9/1993 | United Kingdom . | |
| 2265584 | 10/1993 | United Kingdom . | |
| 2270657 | 3/1994 | United Kingdom . | |

Primary Examiner—Margaret A. Focarino
Assistant Examiner—Christopher Ellis
Attorney, Agent, or Firm—Evenson, McKeown, Edwards & Lenahan

[57] ABSTRACT

A cover panel is provided for an airbag which is folded into a housing and, in a cover position, covers the housing opening. The panel is connected to a surrounding surface via at least one web. An unfolding opening is cleared as a result of the web breaking off during unfolding of the airbag. Each web projects in a tongue shape into the surrounding surface. A predetermined break point of the web is provided outside the opening edge of the unfolding opening in the region of the surrounding surface.

3 Claims, 1 Drawing Sheet

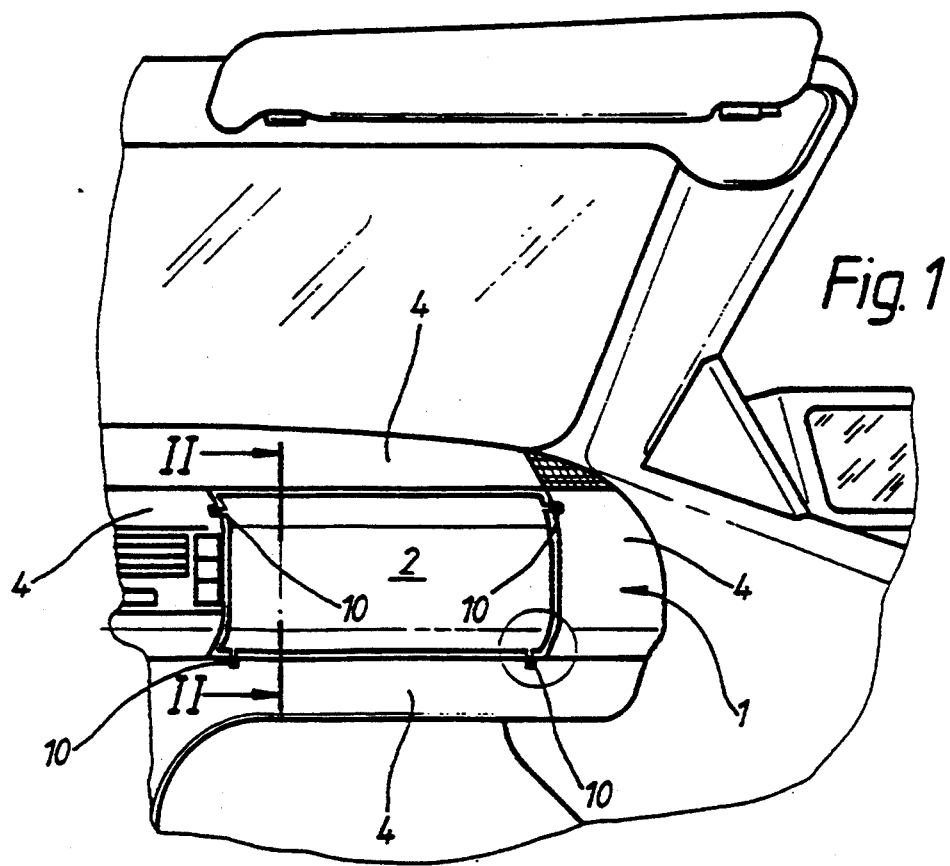
Fig. 1
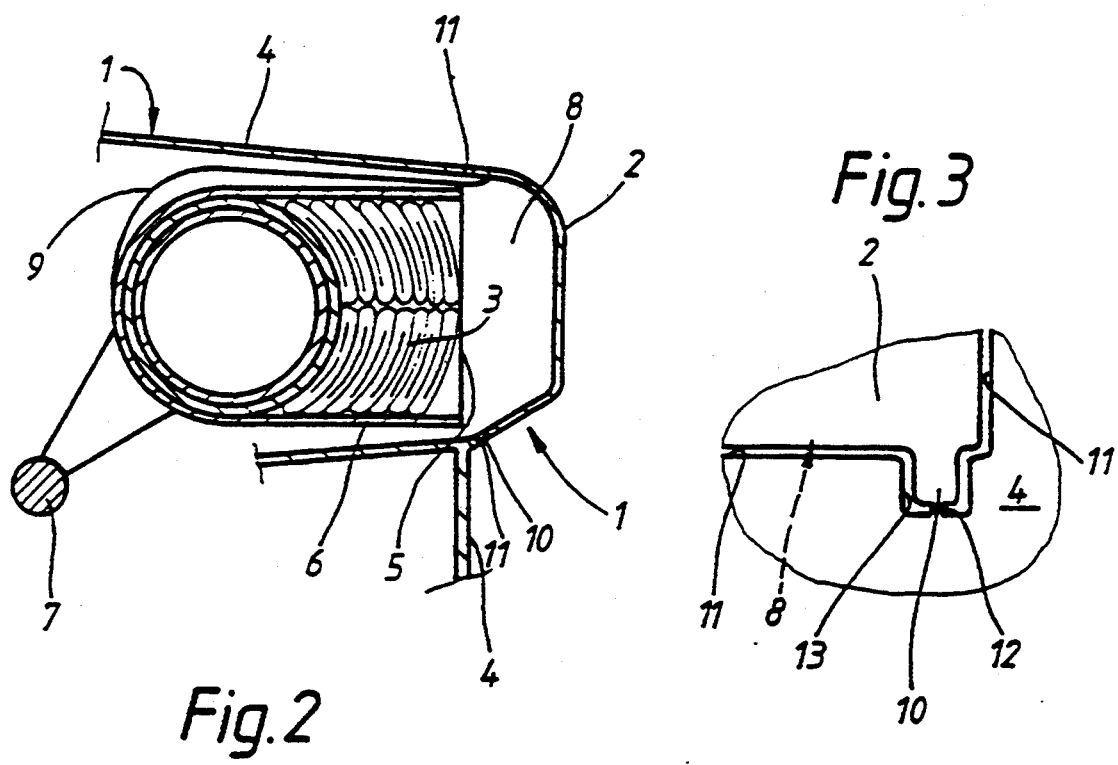
Fig. 2
Fig. 3

FOLDED AIRBAG COVER PANEL

BACKGROUND AND SUMMARY OF THE INVENTION

The present invention relates to a cover panel and, more particularly, to a cover panel for an airbag configured to be folded into a housing, the cover panel being sized and configured to cover, in a cover position, an opening of the housing and being connected to a surrounding surface via at least one web, an unfolding opening is arranged between the panel and the housing and is cleared as a result of said at least one web breaking off during unfolding of the airbag.

DE-A 3,800,652 shows tongue-shaped connecting webs provided on a cover panel of an airbag housing. The predetermined break points of the connecting webs are located outside the opening edge of the unfolding opening, which is brought about by the cover panel being enlarged so that, in the edge region, it engages over the unfolding opening to a large extent. This arrangement is not always constructionally feasible or desired. Moreover, the predetermined break points of the connecting webs lie at the unfolding opening, as a result of which the airbag could be damaged as it unfolds.

EP-B 0,370,6713 and DE-A 4,137,926 disclose a housing for an airbag to be folded into and comprises an opening which, after the folding away of a cover panel, permits the airbag to unfold in the direction of a vehicle occupant who is being thrown forwards during an accident. The cover panel has in the covering position numerous webs which connect to the adjoining housing and are broken off by the unfolding pressure of the airbag. In this unfolding process, possibly sharp-edged remains of the webs which protrude rigidly from the opening edge are left behind. It is thus possible for the remains of the weds to damage the airbag as it unfolds with high pressure and at a high speed through the opening.

An object on which the present invention is based to provide an airbag housing in which an opening edge is soft to the touch for the unfolding of an airbag.

The foregoing object has been achieved by providing at least one web which has a protruding tongue shape matched to a respectively assigned cut-out of the surrounding surface and a predetermined break point of said at least one web is provided outside the opening edge of the unfolding opening within the cut-out of the surrounding surface.

With most conventional fiber-reinforced plastics which are used for airbag cover panels, a sharp-edged fracture pattern would be produced on the connecting webs to be broken off. The configuration of the predetermined break point of the web outside the opening edge of the unfolding opening in the region of the surrounding surface reduces risk of damage to the unfolding or unfolded airbag since contact with the predetermined break point is avoided. Furthermore, it is still possible to construct the cover panel integrally with the surrounding surface. That is, the cover panel can be formed as one piece with the surrounding surface and coated and only subsequently punched or cut out, afterwhich the cower panel remains connected to the surrounding surface exclusively by the web or webs.

A visually appealing and functionally reliable web is achieved by a tongue-shaped continuation of the cover panel into a similarly shaped cut-out of the surrounding surface with the predetermined break point provided there. Connecting the cover panel to the surrounding surface in this way using one, or a few, webs is also suitable in terms of costs, inter alia, for cover panels which are completely separated from the surrounding surface after the unfolding of the airbag and during the unfolding of the airbag remain connected to the housing for example only by means of one strap, one strip of sheet metal or one flexible plastic part.

BRIEF DESCRIPTION OF THE DRAWINGS

These and other objects, features and advantages of the present invention will become more readily apparent from the following detailed description when taken in conjunction with the accompanying drawings wherein:

FIG. 1 is a perspective view of a dashboard with a cover panel in accordance with the present invention over a folded-in airbag;

FIG. 2 is a cross-sectional view along the line II—II in FIG. 1; and

FIG. 3 is an isolated enlarged view of the connecting web indicated by a circle in FIG. 1.

DETAILED DESCRIPTION OF THE DRAWINGS

In FIG. 1, a portion of a vehicle passenger compartment is illustrated in which a cover panel 2 for an airbag 3 (FIG. 2) for a front seat passenger is arranged in a dashboard 1. As can best be seen in FIG. 2, the cover panel 2 is integrated into a surrounding housing surface 4 of the dashboard 1 and covers a housing opening 5 of an airbag housing 6 in which the airbag 3 lies folded. The housing 6 is secured to a vehicle crossmember 7 in a front forward structure and also contains the assemblies for filling the airbag 3. In the event of an accident, the cover panel 2 is forced away by the airbag 3 as the latter fills up. As a result, the cover panel 2 clears an unfolding opening 8 in the dashboard 1 and only continues to be held on the crossmember 7 and near to the housing 6 by a strap 9.

FIG. 3 shows in more detail one of the webs 10 which, in cover position, connect the cover panel 2 to the surrounding surface 4 of the dashboard 1, and which are broken off during the unfolding of the airbag 3. Each web 10 projects outside the opening edge 11 of the unfolding opening 8 into the surrounding surface 4. A predetermined break point 12 of the web 10 also lies formed outside the opening edge 11 of the unfolding opening 8 in the region of the surrounding surface 4. As a result, it is ensured that, as it unfolds or even during later loading, the airbag 3 does not come into contact with the break point and there is thus no risk of damage.

The above-described simple measure for securing the cover panel 2 also makes it possible for the cover panel 2 to be shaped and coated in a cost-effective, integral fashion with the surrounding surface 4 and to remain connected to the surface 4 exclusively by the webs 10 after a punching or cutting process. In order to secure the cover panel 2, only one web 10, arranged at a suitable point, might be adequate. A visually attractive and functionally reliable configuration of the webs 10 is realized by a tongue-shaped continuation of the cover panel 2 into a similarly shaped cut-out 13 of the surrounding surface 4 with the predetermined break point 12 constructed there.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A cover panel for an airbag configured to be folded into a housing, the cover panel being sized and configured to cover, in a cover position, a housing opening of a predetermined area and being connected to a surrounding surface via at least one web such that an unfolding opening region is defined between the panel and the housing, wherein said at least one web has a protruding tongue shape matched to a respectively assigned cut-out of the surrounding surface and a predetermined break point of said at least one web is provided outside the predetermined area of the housing opening such that the airbag does not contact the break point as it passes out of the housing opening into the unfolding opening region.

2. The cover panel according to claim 1, wherein the cover panel is integral with the surrounding surface and, after a cutting-out process, remains connected thereto exclusively by said at least one web.

3. The cover panel according to claim 1, wherein after the unfolding of the airbag, the cover panel is completely separated from the surrounding surface and is held near to the housing by a flexible strap.

* * * * *